US012335409B2

(12) United States Patent
Okuda et al.

(10) Patent No.: US 12,335,409 B2
(45) Date of Patent: Jun. 17, 2025

(54) INFORMATION PROCESSING APPARATUS, PROGRAM EXECUTION SYSTEM, INFORMATION PROCESSING METHOD AND PROGRAM (71) Applicant: NIPPON TELEGRAPH AND TELEPHONE CORPORATION, Tokyo (JP)

(72) Inventors: Tetsuya Okuda, Tokyo (JP); Koji Chida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 199 days.

(21) Appl. No.: 18/256,113

(22) PCT Filed: Jan. 27, 2021

(86) PCT No.: PCT/JP2021/002896
§ 371 (c)(1),
(2) Date: Jun. 6, 2023

(87) PCT Pub. No.: WO2022/162797
PCT Pub. Date: Aug. 4, 2022

(65) Prior Publication Data
US 2024/0113894 A1    Apr. 4, 2024

(51) Int. Cl.
*H04L 9/32*    (2006.01)
*H04L 9/08*    (2006.01)

(52) U.S. Cl.
CPC .......... *H04L 9/3257* (2013.01); *H04L 9/0825* (2013.01)

(58) Field of Classification Search
CPC ............................ H04L 9/3257; H04L 9/0825
USPC ......................................................... 713/180
See application file for complete search history.

(56) References Cited

U.S. PATENT DOCUMENTS

2018/0300493 A1* 10/2018 Li ........................... G06F 21/64

FOREIGN PATENT DOCUMENTS

| JP | 2003216879 A | * | 7/2003 | |
| JP | 2006101225 A | * | 4/2006 | |
| WO | WO-2010024312 A1 | * | 3/2010 | .......... H04L 9/3073 |
| WO | WO-2020185582 A1 | * | 9/2020 | .......... H04L 9/0637 |

OTHER PUBLICATIONS

Ménétrey, J. et al., "Attestation Mechanisms for Trusted Execution Environments Demystified", In: Eyers, D., Voulgaris, S. (eds) Distributed Applications and Interoperable Systems. DAIS 2022. Lecture Notes in Computer Science, vol. 13272. Springer, Cham. https://doi.org/10.1007/978-3-031-16092-9_7.

(Continued)

*Primary Examiner* — Moeen Khan
(74) *Attorney, Agent, or Firm* — IPUSA, PLLC (57) ABSTRACT An information processing apparatus includes a secure area configured to execute a program in secret, and a security chip. The secure area conceals information related to the program, and requests the security chip to provide a blind signature with respect to the concealed information obtained by the concealing. The security chip calculates the blind signature and returns the blind signature to the secure area. The secure area acquires a signature with respect to the information related to the program from the blind signature.

4 Claims, 6 Drawing Sheets (56) References Cited

OTHER PUBLICATIONS

Chaum D., "Blind Signatures for Untraceable Payments", In: Chaum D., Rivest R.L., Sherman A.T. (eds) Advances in Cryptology. Springer, Boston, MA. https://doi.org/10.1007/978-1-4757-0602-4_18, 1983.

* cited by examiner

INFORMATION PROCESSING APPARATUS, PROGRAM EXECUTION SYSTEM, INFORMATION PROCESSING METHOD AND PROGRAM

TECHNICAL FIELD

The present invention relates to a secret execution technique and a remote verification technique in the field of information communication.

BACKGROUND ART

A TEE (Trusted Execution Environment), which is a function capable of safely executing critical processing independently of an OS, is included in recent machines. The machine includes a terminal such as a smart phone in addition to a server or the like.

A machine having a TEE function has a secure area (which may be referred to as an enclave) which does not cause data to be leaked to the outside. In particular, in some TEEs such as SGX by Intel (registered trademark), a mechanism (Remote Attestation or the like) is provided for guaranteeing that a correct program is running in the secure area (the enclave) to the outside of the secure area (for example, the outside of the secure area in the machine or a remote user communicating with the machine).

CITATION LIST

Non-Patent Document

[Non-Patent Document]Ménétrey, J. et al. (2022). Attestation Mechanisms for Trusted Execution Environments Demystified. In: Evers. D., Voulgaris. S. (eds) Distributed Applications and Interoperable Systems. DAIS 2022. Lecture Notes in Computer Science, vol 13272. Springer, Cham. https://doi.org/10.1007/978-3-031-16092-9_7

SUMMARY OF INVENTION

Technical Problem

However, a TEE (hereinafter, referred to as a general TEE) other than some TEEs such as SGX of Intel (registered trademark) is not provided with the mechanism described above (for example, the technique described in Non-Patent Document 1). Therefore, in a general TEE, although it can be guaranteed that data in the secure area will not be leaked to the outside of the secure area such as an OS, it cannot be guaranteed that a correct program is running in the secure area, to the outside of the secure area or to a remote user.

The present invention is made in view of the above-mentioned point, and an object of the present invention is to implement a mechanism for guaranteeing that a correct program is running in a secure area, to the outside of the secure area in an apparatus including a general TEE.

Solution to Problem

According to the disclosed technique, an information processing apparatus is provided to include:
  a secure area configured to execute a program in secret; and
  a security chip, wherein
  the secure area conceals information related to the program, and requests the security chip to provide a blind signature with respect to the concealed information obtained by the concealing, and the security chip calculates the blind signature and returns the blind signature to the secure area, and the secure area acquires a signature with respect to the information related to the program from the blind signature.

Advantageous Effects of Invention

According to the disclosed technique, in an apparatus including a general TEE, a mechanism for guaranteeing, to the outside of the secure area, that a correct program is running in a secure area can be implemented.

DESCRIPTION OF EMBODIMENTS

Figure 1:
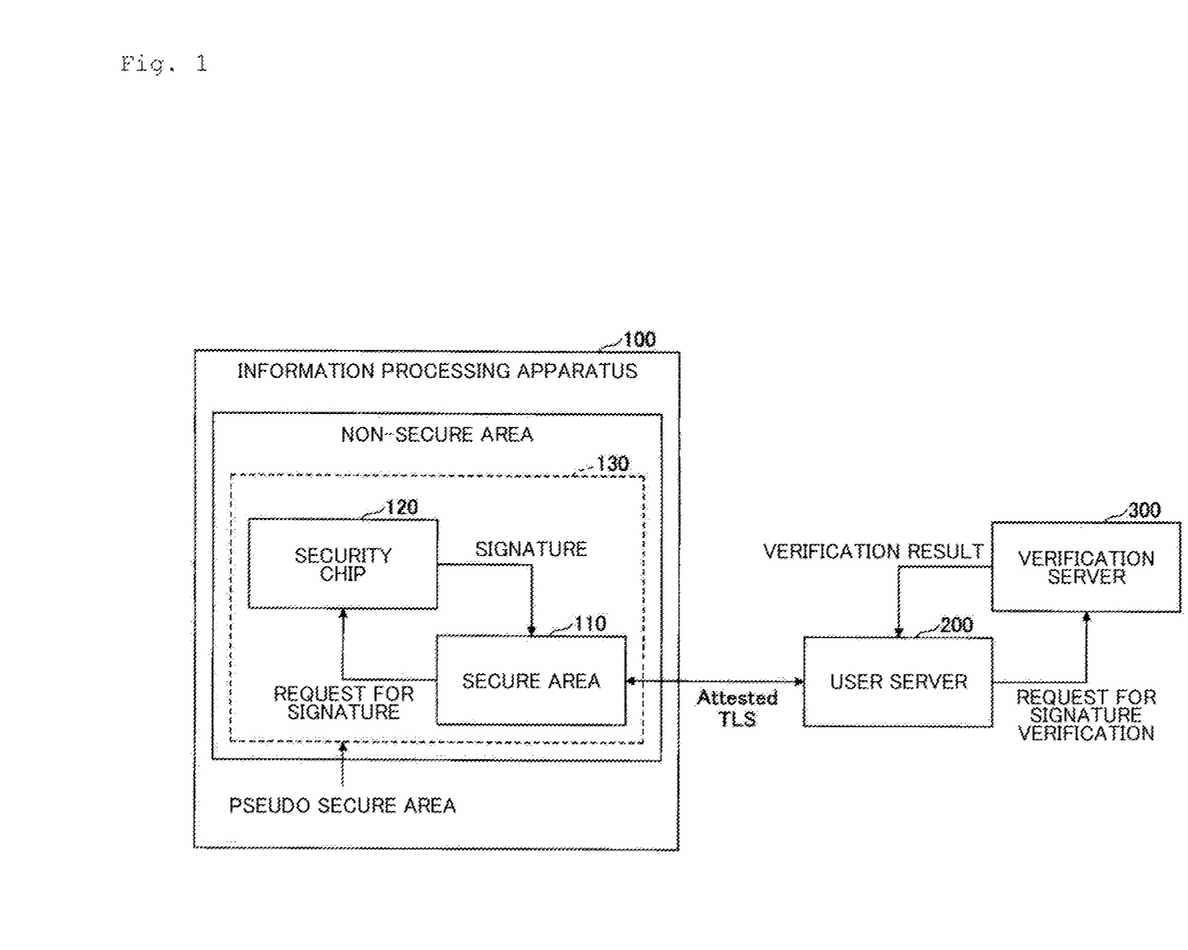
FIG. 1 is an overall configuration diagram of a system according to an embodiment of the present invention.

Hereinafter, an embodiment of the present invention (the present embodiment) will be described with reference to the drawings. The embodiment to be described below is merely exemplary and embodiments to which the present invention is applied are not limited to the following embodiment.
(System Configuration)
FIG. 1 illustrates a configuration example of a program execution system according to an embodiment of the present invention. As illustrated in FIG. 1, the program execution system according to the present embodiment includes an information processing apparatus 100, a user server 200, and a verification server 300. The apparatuses are connected to a communication network and can communicate with each other.

The information processing apparatus 100, the user server 200, and the verification server 300 may each be a physical machine (computer) or a virtual machine on a cloud. In addition, the user server 200 may be a function (example: a Web browser) that runs on a physical machine or a virtual machine.

In the present embodiment, the information processing apparatus 100 has a function of a general TEE. That is, as illustrated in FIG. 1, the information processing apparatus 100 is provided with a secure area 110 (which may be referred to as an enclave) of a general TEE.

The information processing apparatus 100 is an apparatus that executes a program in the secure area 110. The user server 200 confirms authenticity of a program in the information processing apparatus 100 using the verification server 300, and requests the information processing apparatus 100 to perform, for example, data processing or the like by the program. The verification server 300 manages a public key corresponding to a secret key used as a signature key in the information processing apparatus 100, and verifies a signature made in the information processing apparatus 100.

As illustrated in FIG. 1, the information processing apparatus 100 includes a security chip 120 in addition to the secure area 110. The secure area 110 may be referred to as a first secure area and the security chip 120 may be referred to as a second secure area.

The security chip 120 has a tamper-resistant area that securely stores the signature key (the secret key) including measures against physical attack by a machine owner. The security chip 120 corresponds to a TPM (Trusted Platform Module), an SE (Secure Element), or the like, which is attached to many machines having a general TEE.

When the technique according to the present embodiment is not used, an area between the secure area 110 and the security chip 120 in the information processing apparatus 100 is a non-secure area, and tampering by a machine owner cannot be prevented in communication between the secure area 110 and the security chip 120.

With the technique according to the present embodiment, by giving a blind signature (which can be referred to as an attestation) representing authenticity with respect to a program in the secure area 110 using a signature key stored in the security chip 120, communication between the secure area 110 and the security chip 120 is concealed and a pseudo secure area 130 is generated.

The pseudo secure area 130 is an area including the secure area 110 and the security chip 120. The generation of the pseudo secure area 130 by concealing the communication between the secure area 110 and the security chip 120 corresponds to pseudo implementation of Remote Attestation in SGX of Intel or the like.

The mechanism described above achieves a tampering detection function with respect to a program and data in the secure area 110 and a concealing function by a blind signature with respect to the communication between the secure area 110 and the security chip 120.

In other words, the information processing apparatus 100 including the general TEE can guarantee, by having the above function, that a correct program is running in the secure area 110, to the outside of the secure area 110 or to remote users.

(Functional Configuration Example of the Apparatus)

Figure 2:
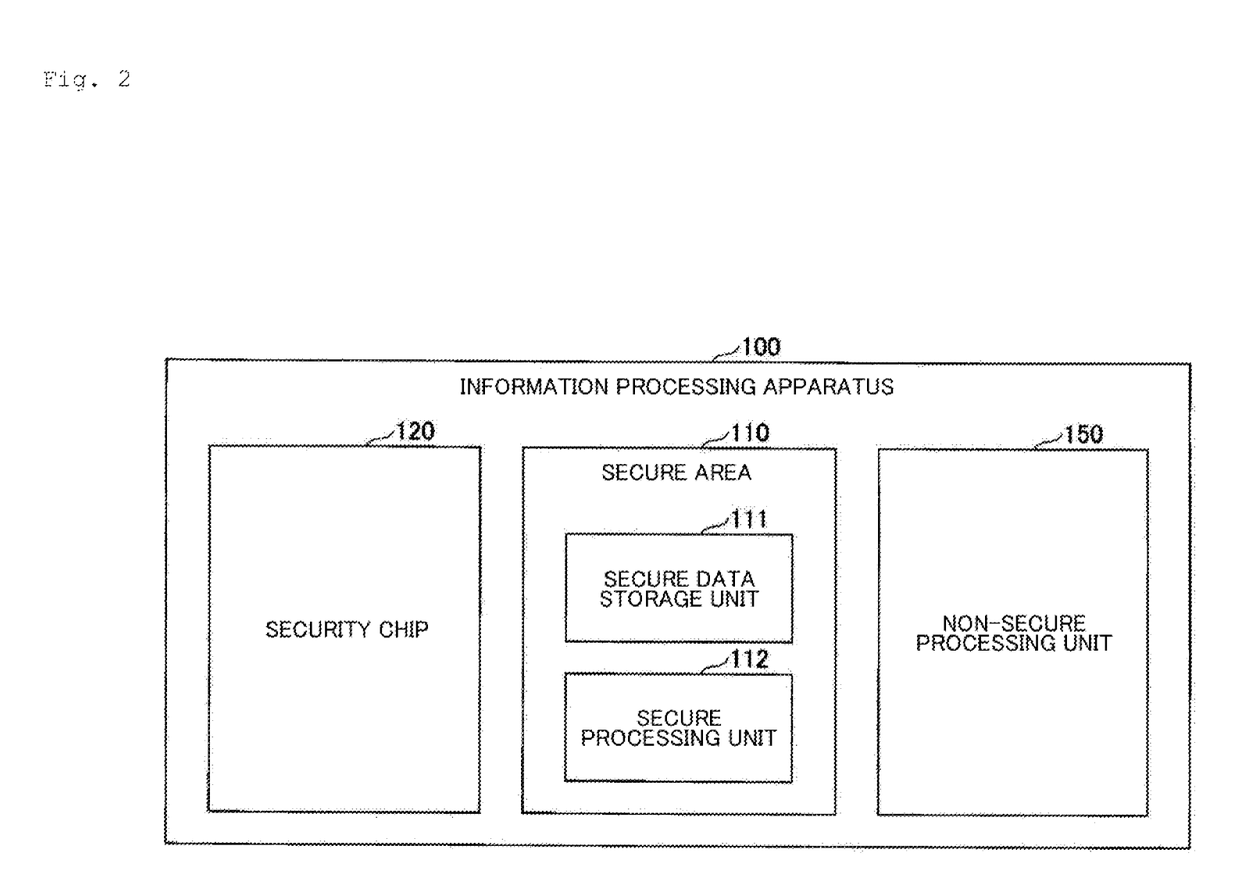
FIG. 2 is a diagram illustrating a functional configuration example of an information processing apparatus.

FIG. 2 illustrates a functional configuration example of the information processing apparatus 100. As illustrated in FIG. 2, the information processing apparatus 100 includes the secure area 110, the security chip 120, and a non-secure processing unit 150.

The secure area 110 is a protected area in which confidentiality is maintained, and contents of data and a program in the secure area 110 cannot be known from the outside. Normal data storing, data processing (program execution), and data transmission and reception can be performed outside of the secure area 110 (the inside the security chip 120 is excluded). A function performing such normal processing is depicted as the non-secure processing unit 150.

In the secure area 110, data storing and data processing (program execution) can be performed while maintaining confidentiality. FIG. 2 illustrates a secure data storage unit 111 and a secure processing unit 112 as functional units that perform these operations in the secure area 110.

The secure area 110 itself can be implemented by existing techniques. Any technique may be used as the existing technique implementing the secure area 110. For example, the secure area 110 may be implemented as a separate chip which is hardware independent from the main CPU or memory, or the secure area 110 may be implemented by software by utilizing an encryption technique/authentication technique.

As described earlier, the security chip 120 has a tamper-resistant area that securely stores the signature key (the secret key) including measures against a physical attack by a machine owner. In addition, the security chip 120 can execute at least a signature operation using the secret key.

Figure 3:
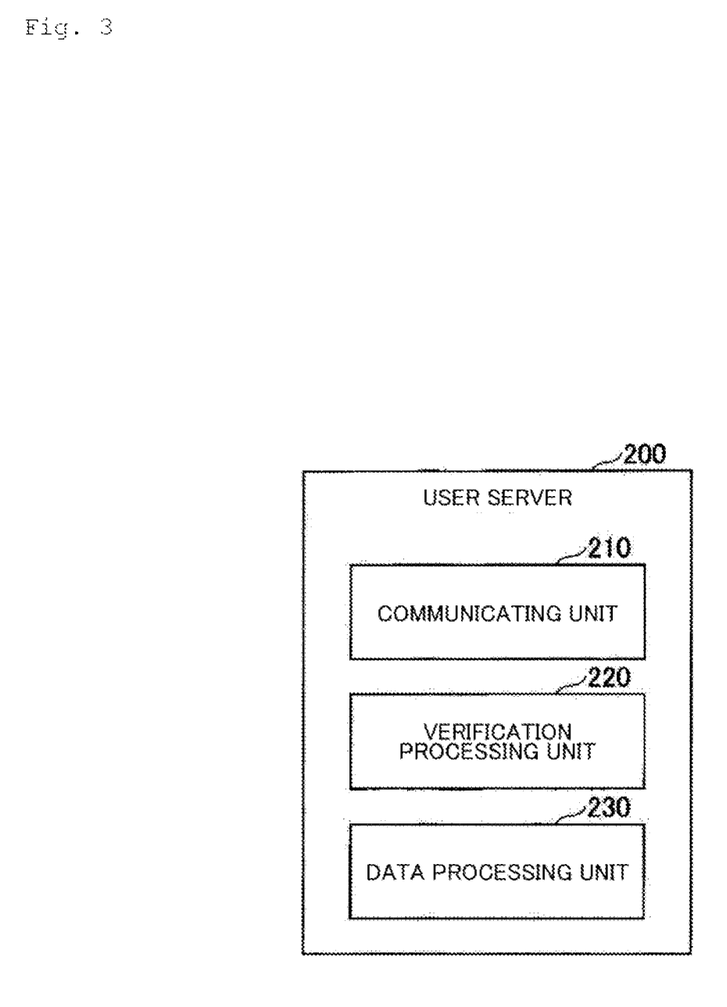
FIG. 3 is a functional configuration diagram of a user server.

FIG. 3 illustrates a functional configuration example of the user server 200. As illustrated in FIG. 3, the user server 200 includes a communicating unit 210, a verification processing unit 220, and a data processing unit 230. The communicating unit 210 is a functional unit that communicates with the information processing apparatus 100 and the verification server 300. The verification processing unit 220 requests the verification server 300 to verify a signature in the information processing apparatus 100 and receives a verification result.

When the authenticity of the program in the information processing apparatus 100 can be confirmed by the signature verification, the data processing unit 230 executes processing such as requesting the information processing apparatus 100 to perform data processing with the program and the like.

Figure 4:
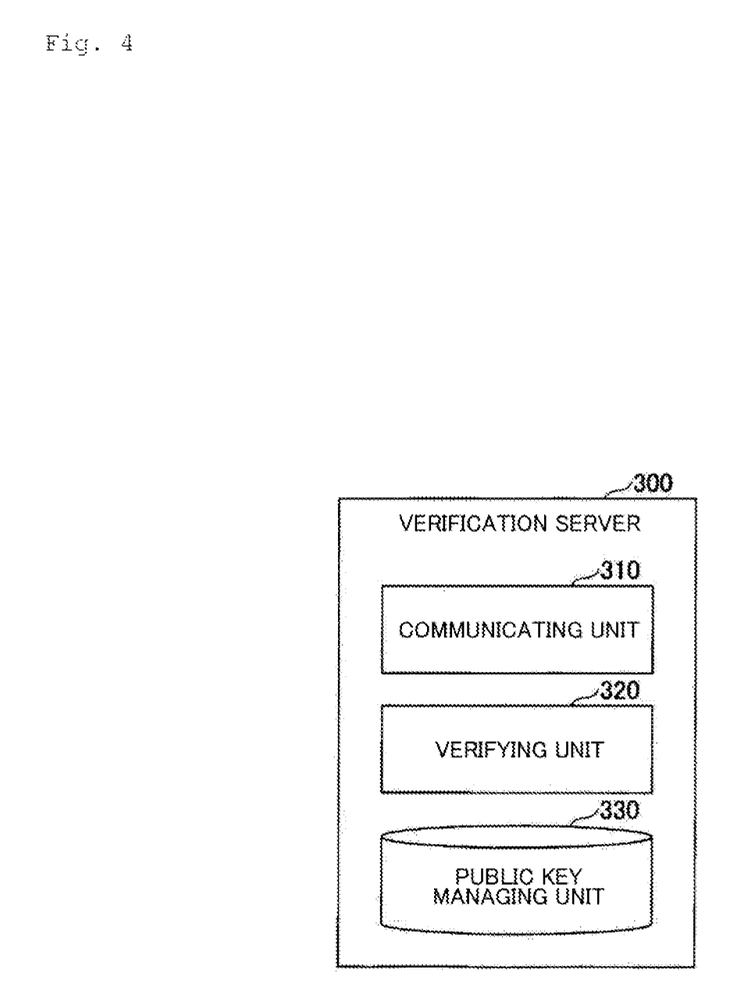
FIG. 4 is a functional configuration diagram of a verification server.

FIG. 4 illustrates a functional configuration example of the verification server 300. As illustrated in FIG. 4, the verification server 300 includes a communicating unit 310, a verifying unit 320, and a public key managing unit 330. The communicating unit 310 is a functional unit that communicates with the information processing apparatus 100 and the user server 200.

The verifying unit 320 executes the verification of the signature in the information processing apparatus 100 by using a public key. The public key managing unit 330 holds a public key corresponding to the secret key used as the signature key in the information processing apparatus 100.

(Operation Example of the System)

Next, an example of an operation of the program execution system according to the present embodiment will be described with reference to the sequence diagram of FIG. 5. In the following operation example, a blind signature is used (the reference document: Chaum D. (1983) Blind Signatures for Untraceable Payments. In: Chaum D., Rivest R. L., Sherman A. T. (eds) Advances in Cryptology. Springer, Boston, MA. https://doi.org/10.1007/978-1-4757-0602-4_18).

In the blind signature, because a creator of a message conceals the message when requesting a signer to perform signature processing, the signer cannot know what message the signer has signed. The creator of the message can generate a signature with respect to the original message from the signature with respect to the concealed message obtained from the signer.

Although a blind signature based on an RSA signature is used as the blind signature in the following operation example, this is simply an example and any type of blind signature may be used. For example, a blind signature of a system using elliptic-curve cryptography may be used.

Figure 5:
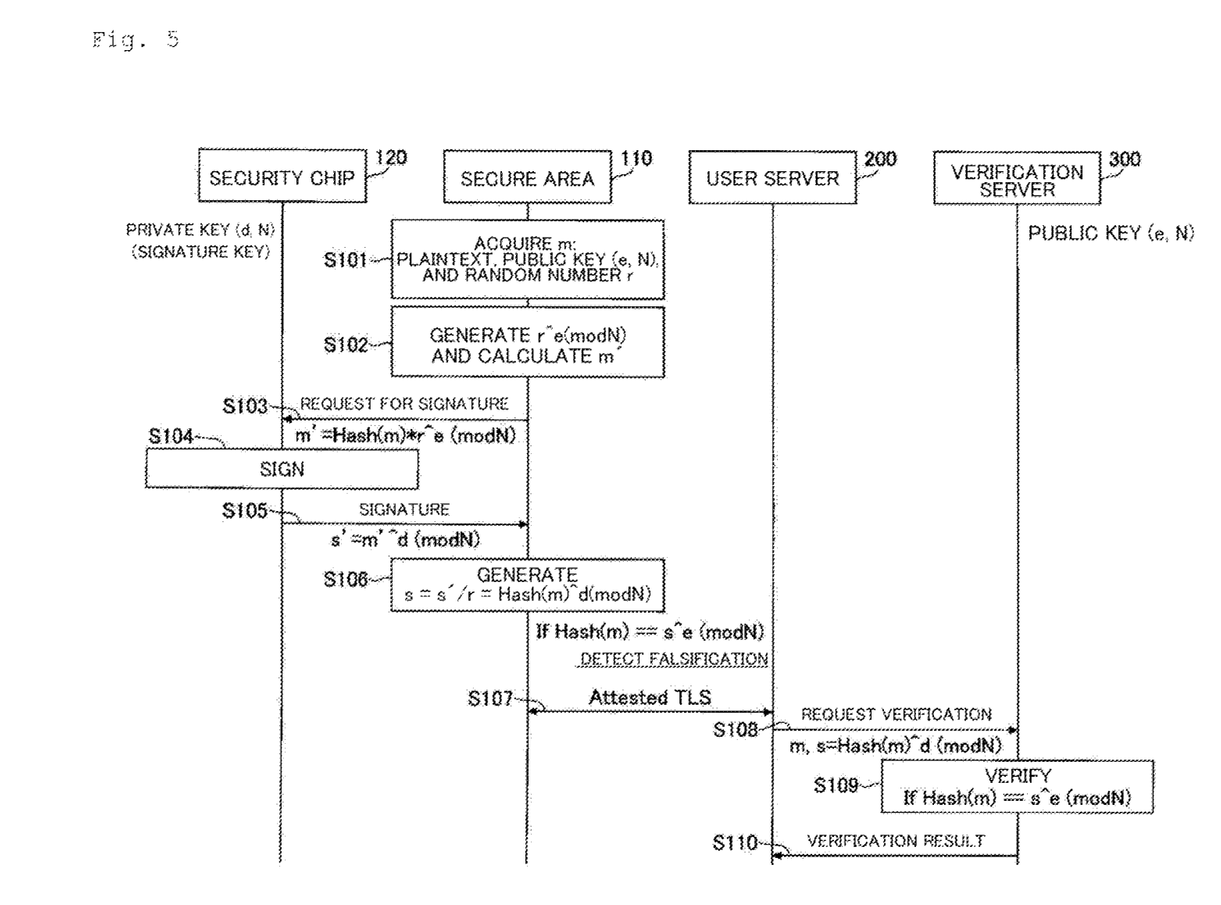
FIG. 5 is a flowchart for explaining a flow of processing.

In S101 in FIG. 5, the secure processing unit 112 in the secure area 110 acquires m that is a plaintext to be signed (a plaintext for which authenticity of a program is to be confirmed), a public key (e, N), and a random number r. For example, the secure processing unit 112 acquires the public key (e, N) from the verification server 300. The secure processing unit 112 may read and use the public key (e, N) stored in the secure data storage unit 111 in advance.

m may be referred to as an attested resource. Although m is not limited to a specific piece of information, in the present operation example, m includes an ID of the secure area 110, a hash value of the program executed on the secure area 110, and a hash value of an initial state of the secure area 110.

In S102, by calculating Hash(m) that is a hash value of m and encrypting r with the public key, the secure processing unit 112 calculates $r\hat{}e(\bmod N)$ and $\text{Hash}(m) \times r\hat{}e(\bmod N)$. Because Hash(m) is concealed by $r\hat{}e(\bmod N)$, $r\hat{}e(\bmod N)$ may be referred to as a blinding factor. $\text{Hash}(m) \times r\hat{}e(\bmod N)$ will be denoted by m'.

In S103, the secure processing unit 112 transmits m' to the security chip 120 to request a signature with respect to m' $(=\text{Hash}(m) \times r\hat{}e(\bmod N))$.

The security chip 120 holds a secret key (d, N) that corresponds to the public key (e, N). In S104, the security chip 120 calculates the signature with respect to m' by using the secret key (d, N) as a signature key. Specifically, the security chip 120 calculates $s'=m'\hat{}d(\bmod N)$. The signature s' with respect to m' may be referred to as a blind signature.

In S105, the security chip 120 transmits the signature $(s'=m'\hat{}d(\bmod N))$ to the secure area 110.

In S106, by dividing s' with r, the secure processing unit 112 of the secure area 110 acquires a signature s with respect to Hash(m). In other words, $s=s'/r=\text{Hash}(m)\hat{}d(\bmod N)$ is calculated.

Due to s, it is possible to use the public key (e, N) to verify whether m has been tampered with. In other words, for example, when the verification is performed in the secure area 110, the secure processing unit 112 acquires the current m and calculates Hash(m) and also calculates $s\hat{}e(\bmod N)$. $s\hat{}e(\bmod N)$ corresponds to decoding the signature s using the public key (e, N).

When Hash(m) is equal to $s\hat{}e(\bmod N)$, it is determined that there has been no tampering, but when Hash(m) is not equal to $s\hat{}e(\bmod N)$, it is determined that there has been tampering.

The tampering detection processing described above may be performed by the user server 200 or by the verification server 300. In the example illustrated in FIG. 5, the verification server 300 performs the tampering detection processing.

In S107, for example, the verification processing unit 220 of the user server 200 acquires m and s from the secure area 110. In S108, the verification processing unit 220 transmits m and s to the verification server 300 to request verification as to whether m has been tampered with. Alternatively, in S108, the verification processing unit 220 may transmit Hash(m) and s to the verification server 300 to request the verification as to whether m has been tampered with.

In S109, the verifying unit 320 of the verification server 300 verifies whether m has been tampered with by using the public key (e, N) held in the public key managing unit 330 to confirm whether Hash(m) is equal to $s\hat{}e(\bmod N)$. In S110, the verification server 300 transmits a verification result to the user server 200.

The user server 200 can request the secure area 110 to execute data processing or the like by a program that runs in the secure area 110 after confirming the authenticity of the program using the mechanism of the tampering detection described above. In other words, it can be said that the user server 200 and the secure area 110 are connected by a channel in which the authenticity of the program is guaranteed, which is depicted as an Attested TLS in FIG. 5.

As described above, in the present operation example, because the verification processing for the tampering detection is performed on the side of the user server 200, the program cannot be tampered with from the outside of the secure area 110. In addition, in a standard model (Hash is not assumed to be a random oracle), partial information about m is not leaked from m' by r. Furthermore, because the signature processing itself in the security chip 120 is normal signature processing, the signature processing can be executed in the security chip 120.

(Hardware Configuration Example)

The information processing apparatus 100, the user server 200, and the verification server 300 can all be implemented by, for example, causing a computer to execute a program. The computer may be a physical computer or a virtual machine on a cloud. The information processing apparatus 100, the user server 200, and the verification server 300 will be collectively referred to as an "apparatus".

Specifically, the apparatus can be implemented by executing a program corresponding to the processing executed by the apparatus using hardware resources such as a CPU and a memory that are built into the computer. The program can be saved or distributed by being recorded in a computer-readable recording medium (such as a portable memory). The program can be also provided through a network such as the Internet or email.

Figure 6:
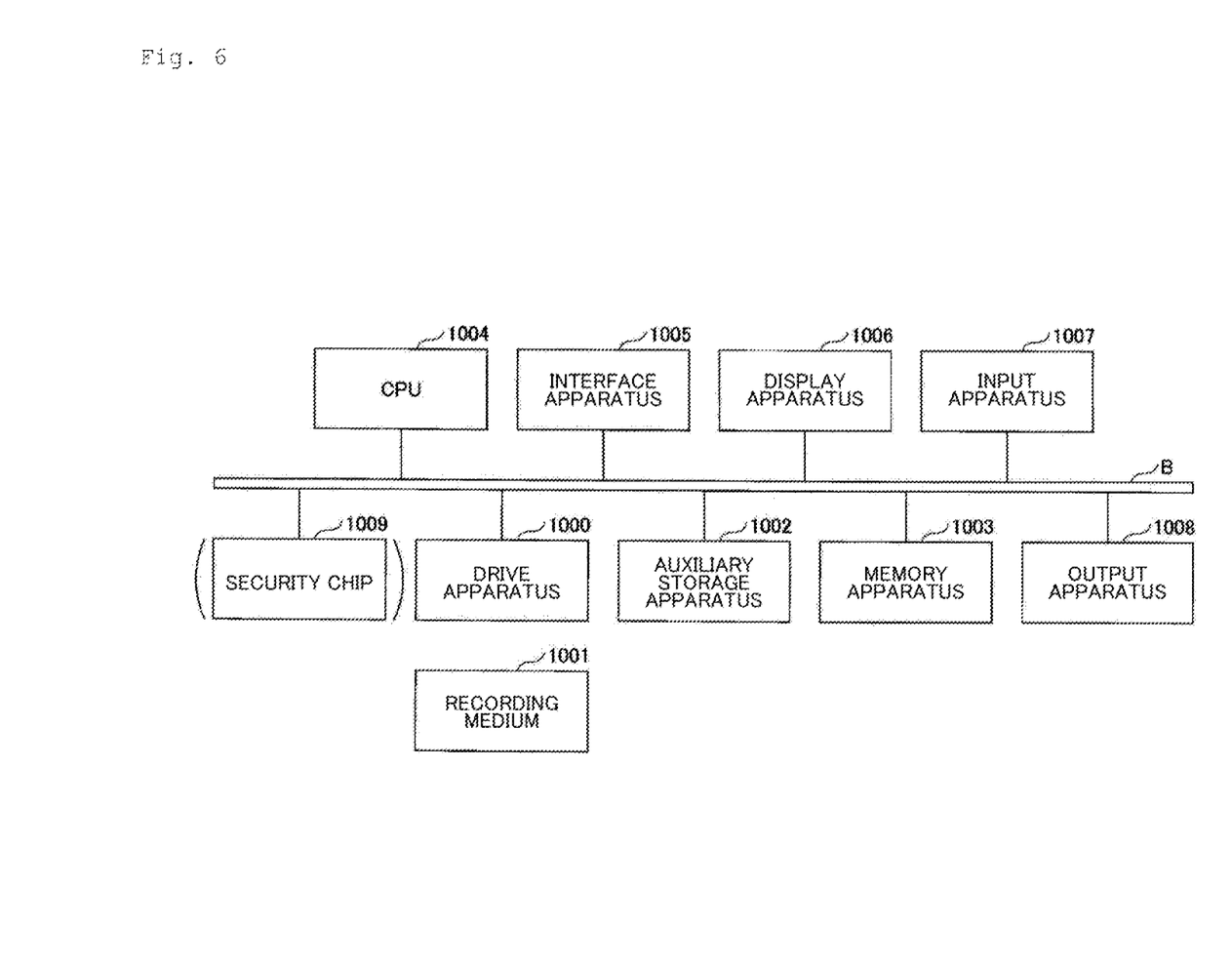
FIG. 6 is a diagram illustrating a hardware configuration example of an apparatus.

FIG. 6 is a diagram illustrating a hardware configuration example of the computer. The computer illustrated in FIG. 6 includes a drive apparatus 1000, an auxiliary storage apparatus 1002, a memory apparatus 1003, a CPU 1004, an interface apparatus 1005, a display apparatus 1006, an input apparatus 1007, an output apparatus 1008, and the like, which are connected to each other by a bus BS. It should be noted that some of these apparatuses may not be provided. For example, when display is not performed, the display apparatus 1006 may not be provided. In addition, the information processing apparatus 100 includes a security chip 1009 (which corresponds to the security chip 120 described above).

The program that implements the processing in the computer is provided by, for example, a recording medium 1001 such as a CD-ROM or a memory card. When the recording medium 1001 having the program stored therein is set in the drive apparatus 1000, the program is installed in the auxiliary storage apparatus 1002 from the recording medium 1001 via the drive apparatus 1000. However, the program need not necessarily be installed from the recording medium 1001 and may be downloaded from another computer via a network. The auxiliary storage apparatus 1002 stores the installed program and also stores necessary files, data, and the like.

The memory apparatus 1003 reads and stores the program from the auxiliary storage apparatus 1002 when an instruction to start the program is received. The CPU 1004 implements functions related to the apparatus according to the program stored in the memory apparatus 1003. The interface apparatus 1005 is used as an interface for connecting to a network and functions as a transmitting unit and a receiving unit. The display apparatus 1006 displays a GUI (Graphical User Interface) or the like according to the program. The input apparatus 1007 includes a keyboard and mouse, buttons, a touch panel, or the like and is used for inputting various operation instructions. The output apparatus 1008 outputs a calculation result.

Advantageous Effects of the Embodiment

As described above, the technique according to the present embodiment can guarantee that, in an apparatus including a general TEE, a correct program is running in a secure area of the general TEE, to the outside of the secure area (example: the remote user server 200).

SUMMARY OF THE EMBODIMENT

The present specification discloses at least an information processing apparatus, a program execution system, an information processing method, and a program according to the items described below.
(Item 1)
An information processing apparatus, including:
a secure area configured to execute a program in secret; and
a security chip, wherein
the secure area conceals information related to the program, and requests the security chip to provide a blind signature with respect to the concealed information obtained by the concealing,
the security chip calculates the blind signature and returns the blind signature to the secure area, and
the secure area acquires a signature with respect to the information related to the program from the blind signature.
(Item 2)
The information processing apparatus according to item 1, wherein
the secure area uses a public key corresponding to a secret key used as a signature key of the blind signature to conceal the information related to the program.
(Item 3)
A program execution system including the information processing apparatus according to item 1 or 2, a user server, and a verification server, wherein
the user server transmits the information related to the program and the signature to the verification server, and
the verification server verifies the signature and transmits a verification result to the user server.
(Item 4)
The program execution system according to item 2, wherein
in verification of the signature, the verification server confirms whether information related to the program is equal to information obtained by decrypting the signature with a public key corresponding to a secret key used as a signature key of the blind signature.
(Item 5)
An information processing method in an information processing apparatus including a secure area configured to execute a program in secret and a security chip, the information processing method including:
a step of concealing, by the secure area, information related to the program and requesting the security chip to provide a blind signature with respect to concealed information obtained by the concealing;
a step of calculating, by the security chip, the blind signature and returning the blind signature to the secure area; and
a step of acquiring, by the secure area, a signature with respect to the information related to the program from the blind signature.
(Item 6)
A program causing a computer including a secure area configured to execute a program in secret and a security chip to execute a process of:
concealing, by the secure area, information related to the program and requesting the security chip to provide a blind signature with respect to concealed information obtained by the concealing;
calculating, by the security chip, the blind signature and returning the blind signature to the secure area; and
acquiring, by the secure area, a signature with respect to the information related to the program from the blind signature.

While the present embodiment has been described above, the present invention is not limited to the specific embodiment and various modifications and changes can be made within the scope of the gist of the present invention as described in the claims.

REFERENCE SIGNS LIST

100 information processing apparatus
110 secure area
111 secure data storage unit
112 secure processing unit
120 security chip
130 pseudo secure area
200 user server
210 communicating unit
220 verification processing unit
230 data processing unit
300 verification server
310 communicating unit
320 verifying unit
330 public key managing unit
1000 drive apparatus
1001 recording medium
1002 auxiliary storage apparatus
1003 memory apparatus
1004 CPU
1005 interface apparatus
1006 display apparatus
1007 input apparatus
1008 output apparatus

The invention claimed is:

1. An information processing apparatus, comprising:
a secure area implemented as a hardware configured to execute a program;
a user server;
a verification server; and
a security chip, wherein
the secure area conceals information m related to the program by calculating hash of the information m to obtain Hash(m), and requests the security chip to provide a blind signature with respect to concealed information $m'=(\text{Hash}(m) \times r^e (\text{mod} N))$ obtained by concealing the hash by a blinding factor $r^e(\text{mod} N)$, wherein r is random number encrypted by a public key (e, N),
the security chip calculates the blind signature $s'=m'^d (\text{mod} N)$ using a secret key (d, N) and returns the blind signature s' to the secure area,
the secure area acquires a signature s with respect to the information related to the program from the blind signature by dividing s' with r,
the user server transmits, information m related to the program and the signature s to the verification server for verification;
the verification server generates a verification result that verifies whether information m has been tampered using the public key (e, N) by validating whether Hash(m) is equal to $s^e(\text{mod} N)$ and transmits the verification result to the user server, and the user server instructs the secure area to execute data processing by the program in response to confirming authenticity of the program using the verification result.

2. The information processing apparatus according to claim 1, wherein in the verification of the signature, the verification server confirms whether the information related to the program is equal to information obtained by decrypting the signature with a public key corresponding to a secret key used as a signature key of the blind signature.

3. An information processing method in an information processing apparatus including a secure area implemented as a hardware configured to execute a program, a user server, a verification server, and a security chip, the information processing method comprising:

concealing, by the secure area, information m related to the program by calculating hash of the information m to obtain Hash(m), and requesting the security chip to provide a blind signature with respect to concealed information m'=(Hash(m)×r^e(modN)) obtained by concealing the hash by a blinding factor r^e(modN), wherein r is random number encrypted by a public key (e, N);

calculating, by the security chip, the blind signature s'=m'^d(modN) using a secret key (d, N) and returning the blind signature s' to the secure area;

acquiring, by the secure area, a signature s with respect to the information related to the program from the blind signature by dividing s' with r;

transmitting, by the user server, information m related to the program and the signature s to the verification server for verification;

generating, by the verification server, a verification result that verifies whether information m has been tampered using the public key (e, N) by validating whether Hash(m) is equal to s^e(modN) and transmits the verification result to the user server, and instructing, by the user server, the secure area to execute data processing by the program in response to confirming authenticity of the program using the verification result.

4. A non-transitory computer-readable recording medium storing a program causing a computer including a secure area implemented as a hardware configured to execute a program, a user server, a verification server, and a security chip to execute a process of:

concealing, by the secure area, information m related to the program by calculating hash of the information m to obtain Hash(m), and requesting the security chip to provide a blind signature with respect to concealed information m'=(Hash(m)×r^e(modN)) obtained by concealing the hash by a blinding factor r^e(modN), wherein r is random number encrypted by a public key (e, N);

calculating, by the security chip, the blind signature s'=m'^d(modN) using a secret key (d, N) and returning the blind signature s' to the secure area;

acquiring, by the secure area, a signature s with respect to the information related to the program from the blind signature by dividing s' with r;

transmitting, by the user server, information m related to the program and the signature s to the verification server for verification;

generating, by the verification server, a verification result that verifies whether information m has been tampered using the public key (e, N) by validating whether Hash(m) is equal to s^e(modN) and transmits the verification result to the user server, and instructing, by the user server, the secure area to execute data processing by the program in response to confirming authenticity of the program using the verification result.

* * * * *